(12) United States Patent
Rothman et al.

(10) Patent No.: US 10,678,207 B2
(45) Date of Patent: Jun. 9, 2020

(54) METHOD AND APPARATUS FOR THE CONTROL OF A FLOTATION SEPARATION PROCESS, INCLUDING PARAMETERS OF THE FLOTATION PROCESS AND REAGENT ADDITION TO OPTIMIZE MINERAL RECOVERY

(75) Inventors: Paul Joseph Rothman, Windsor, CT (US); Christian Victor O'Keefe, Durham, CT (US)

(73) Assignee: CiDRA Corporate Service Inc., Wallingford, CT (US)

( * ) Notice: Subject to any disclaimer, the term of this patent is extended or adjusted under 35 U.S.C. 154(b) by 1269 days.

(21) Appl. No.: 13/820,033

(22) PCT Filed: Sep. 6, 2011

(86) PCT No.: PCT/US2011/050500
§ 371 (c)(1),
(2), (4) Date: Nov. 12, 2014

(87) PCT Pub. No.: WO2012/031290
PCT Pub. Date: Mar. 8, 2012

(65) Prior Publication Data
US 2015/0160645 A1 Jun. 11, 2015

Related U.S. Application Data

(60) Provisional application No. 61/379,899, filed on Sep. 3, 2010.

(51) Int. Cl.
*B03D 1/00* (2006.01)
*G05B 19/401* (2006.01)
(Continued)

(52) U.S. Cl.
CPC .......... *G05B 19/401* (2013.01); *B03D 1/028* (2013.01); *B07C 5/34* (2013.01); *G05B 2219/37583* (2013.01)

(58) Field of Classification Search
CPC ................. B03D 1/028; G05B 19/401; G05B 2219/37583; B07C 5/34
See application file for complete search history.

(56) References Cited

U.S. PATENT DOCUMENTS 3,434,596 A 3/1969 Knaus
5,073,253 A 12/1991 Bishop et al.
(Continued)

FOREIGN PATENT DOCUMENTS

DE 102006038208 A1 2/2008
WO 2005098377 A1 10/2005
(Continued)

OTHER PUBLICATIONS

Vanegas C et al: "On-line froth acoustic emission measurements in industrial sites", Minerals Engineering, Pergamon Press, Oxford, GB, vol. 21, No. 12-14, Nov. 1, 2008 (Nov. 1, 2008), pp. 883-888, XP025479052, ISSN:0892-6875, DOI: 10.1016/J.MINENG.2008. 04.007 [retrieved on Jun. 2, 2008].
English language machine translation of Abstract of DE10 2006 038208 A1.

*Primary Examiner* — Thomas M Lithgow
(74) *Attorney, Agent, or Firm* — Ware, Fressola, Maguire & Barber LLP

(57) ABSTRACT

A method and apparatus are provided to control of a flotation separation process, including parameters of the flotation process and reagent addition to optimize mineral recovery. The apparatus includes a signal processor or processing module configured at least to receive signalling containing information about at least one acoustic characteristic of a froth layer in a flotation cell or tank of a flotation separation (Continued)

process; and determine a control characteristic related to the flotation separation process based at least partly on the signalling received. The signal processor or processing module may also be configured at least to: provide corresponding signalling containing information to control the flotation separation process based at least partly on the control characteristic determined.

12 Claims, 3 Drawing Sheets

(51) Int. Cl.
*B03D 1/02* (2006.01)
*B07C 5/34* (2006.01)

(56) References Cited

U.S. PATENT DOCUMENTS

| | | | |
|---|---|---|---|
| 5,687,609 A | 11/1997 | Schmalzel | |
| 7,426,852 B1 | 9/2008 | Rothman | |
| 7,770,455 B2 * | 8/2010 | Stencel | B03D 1/14 73/589 |
| 2013/0192351 A1 * | 8/2013 | Fernald | G01F 1/7082 73/61.49 |

FOREIGN PATENT DOCUMENTS

WO    WO 2005/098377 A1 * 10/2005
WO       2008061289 A1    5/2008

* cited by examiner

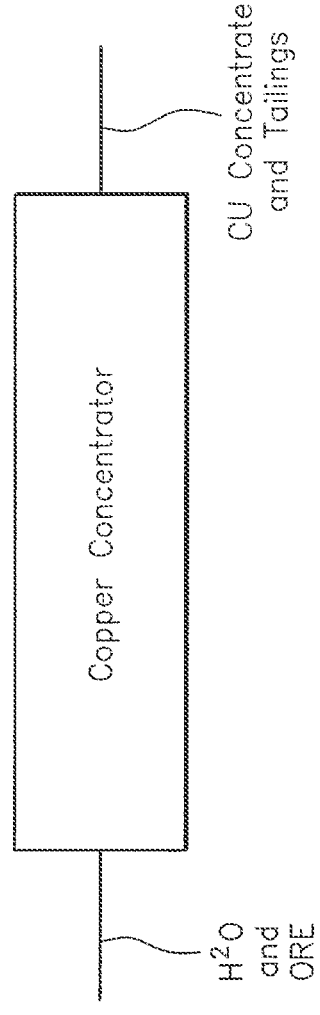
FIG. 1a Mineral Extraction Processing System (PRIOR ART)
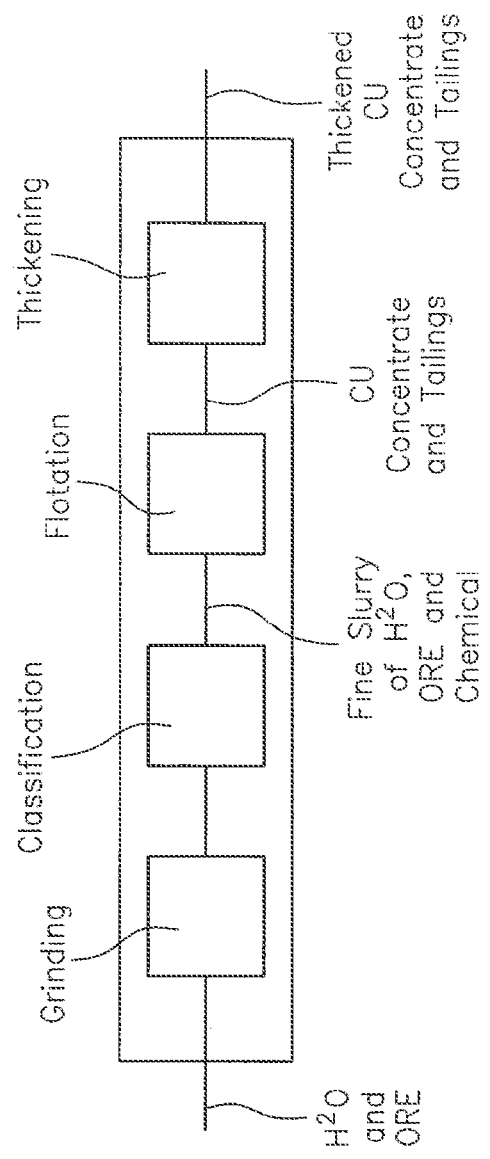
FIG. 1b (PRIOR ART)

Apparatus 10

Signal processor or processing module 12 configured at least to:

Receive signalling containing information about at least one acoustic characteristic of a froth layer 14 in a flotation cell or tank 16 of a flotation separation process; and Determine a control characteristic related to the flotation separation process based at least partly on the signalling received

─ 19

At least one acoustic detection means or device 20 configured to provide the signalling containing information about the at least one acoustic characteristic of the froth layer 14 in the flotation cell or tank 16 of the flotation separation process

Figure 2

50: Receiving signalling containing information about at least one acoustic characteristic of a froth layer in a flotation cell or tank of a flotation separation process 52: Determining a control characteristic related to the flotation separation process based at least partly on the signalling received and using apparatus, including the signal processor or processing module 10

54: Providing corresponding signalling containing information to control the flotation separation process based at least partly on the control characteristic determined

Figure 4

METHOD AND APPARATUS FOR THE CONTROL OF A FLOTATION SEPARATION PROCESS, INCLUDING PARAMETERS OF THE FLOTATION PROCESS AND REAGENT ADDITION TO OPTIMIZE MINERAL RECOVERY

CROSS-REFERENCE TO RELATED APPLICATIONS

This application corresponds to international patent application serial no. PCT/US2011/050500, filed 6 Sep. 2011, which claims benefit to provisional patent application Ser. No. 61/379,899, filed 3 Sep. 2010, which is incorporated by reference in their entirety.

BACKGROUND OF THE INVENTION

1. Field of Invention

This invention relates to a flotation process, e.g., such as a flotation separation process used in a mineral extraction processing system; and more particularly to a technique for controlling such a flotation separation process.

2. Description of Related Art

In many industrial processes, a flotation separation process is used to concentrate and clean the final product. A minerals processing plant, or benefaction plant, is no exception. In the case of a copper concentrator as shown in FIG. 1a, the input to the plant is water and ore (of a particular type and size distribution) and the outputs are copper concentrate and tailings. The processes consist of grinding, classification, flotation and thickening stages, as shown in FIG. 1b. The grinding and classification stages produce a fine slurry of water, ore and chemicals which is then sent to the flotation stage. Once in the flotation stage, air and chemical reagents are used to float the copper minerals, while gange (tailings) is depressed. The recovered copper is cleaned and dried. The tailings are thickened and sent to a tailings pond.

In the flotation stage, the bubbles are introduced to the slurry to carry (float) the desired ore content to the top of the flotation cell, while the tailings are depressed and flow to the bottom of the cell. The performance of the flotation stage is dependent on many parameters. One of those is the floatability of the ore. The floatability is highly dependent on the type and doses of chemical reagents that are used to make the desired particles of ore hydrophobic. The chemical dosing rate is typically defined in units of grams of chemical per ton or ore processed. In some cases, more chemical is added than is necessary in order to make sure that enough is being used. These chemicals are very expensive and make up a sizable portion of a mineral processing plant's operational expenses.

Another factor in the performance of the flotation stage is the size of the bubbles, the overall amount of bubbles, and the rate or speed that the bubbles move/rise through the flotation cell. These bubbles create a layer of froth at the top of the flotation cell. The characteristics of the froth, such as the depth of the froth layer, its composition and its stability, also impact the performance of the flotation stage.

In a typical plant, operators will determine the ore tonnage rate by using a weight scale on the input ore feed to the first stage of grind. Then the reagent is added according to the prescribed dosing rate. It would be possible to optimize the addition of reagent and other control parameter, such as the addition of air and feed rate and density of the ore, to optimize the recovery of ore in the flotation stage.

SUMMARY OF THE INVENTION

In its broadest sense, the present invention provides a new and unique method and apparatus to control a flotation separation process, including parameters of the flotation process and reagent addition to optimize mineral recovery.

According to some embodiments of the present invention, the apparatus may comprise a signal processor or processing module configured at least to:
 receive signalling containing information about at least one acoustic characteristic of a froth layer in a flotation cell or tank of a flotation separation process; and
 determine a control characteristic related to the flotation separation process based at least partly on the signalling received.

According to some embodiments of the present invention, the signal processor or processing module may also be configured at least to: provide corresponding signalling containing information to control the flotation separation process based at least partly on the control characteristic determined.

According to some embodiments of the present invention, acoustic sensing may be used to monitor the characteristics of the froth layer in the flotation cell or tank, e.g., to thereby maximize the recovery of ore. By way of example, the acoustic characteristics of the froth layer may then be used to control, e.g., reagent dosing, ore feed rate, ore feed density, froth depth, superficial gas velocity or other aspects of the flotation cell to maximize ore recovery.

According to some embodiments of the present invention, the acoustic characteristics of the ore may be monitored by using at least one acoustic detection means or device, such as for example a microphone. The acoustic detection means or device may be placed above the froth layer, directly in or near the froth layer, or below the froth layer.

According to some embodiments of the present invention, the at least one acoustic detection means or device may be placed below the froth layer, and the acoustic detection means may monitor the acoustics of the froth cell reflected at the interface between the froth layer and the layer below, known as the pulp zone, due to the difference in acoustic impedance between the froth layer and the pulp zone.

According to some embodiments of the present invention, two or more acoustic detection means or devices may be placed above and below the froth layer, in and below the froth layer, or entirely within the froth layer, and the acoustic detection means or devices may monitor the attenuation through the froth layer, between the froth layer and the pulp zone, between the froth layer and the air above the froth layer, or any combination.

According to some embodiments of the present invention, acoustic detection sensors may be mounted external to the flotation cell. In this embodiment, an acoustic guide may be placed within the tank to optimize the acquisition of the acoustic signal. For example, an acoustic waveguide may be placed within the flotation cell or tank such that the waveguide interacts with the tank solution and gas bubbles, and separate acoustic detection means are mounted on the exterior of the tank to acquire the acoustic signal from the waveguide.

According to some embodiments of the present invention, the acoustic detection means or devices may be positioned at a number of locations, such as above, within, and/or below the froth layer to monitor the acoustic characteristics of the froth layer.

According to some embodiments of the present invention, the at least one acoustic detection means or device may also be used to monitor the acoustic characteristics of the bubbles in the pulp zone to control the flotation cell, e.g., to optimize ore recovery.

According to some embodiments of the present invention, the acoustic detection methods disclosed herein may be augmented with acoustic sources place in, under, next to or above the froth layer.

By way of example, the signal processor or processor module may take the form of a processor and at least one memory including a computer program code, where the processor and at least one memory are configured to cause the apparatus to implement the functionality of the present invention, e.g., receive the signalling containing information about at least one acoustic characteristic of the froth layer in the flotation cell or tank of the flotation separation process; and determine the control characteristic related to the flotation separation process based at least partly on the signalling received. The processor and the at least one memory including the computer program code may also include one or more of the various features set forth above.

According to some embodiments, the present invention may take the form of a method that may comprise steps of receiving the signalling containing information about at least one acoustic characteristic of the froth layer in the flotation cell or tank of the flotation separation process; and determining the control characteristic related to the flotation separation process based at least partly on the signalling received. The method may also include one or more steps for implementing one or more of the various features set forth herein.

According to some embodiments of the present invention, the apparatus may also take the form of a computer-readable storage medium having computer-executable components for performing the steps of the aforementioned method. The computer-readable storage medium may also include, or be configured to perform, steps for implementing one or more of the various features set forth above.

According to some embodiments of the present invention, the apparatus may take the form of means for receiving signalling containing information about at least one acoustic characteristic of a froth layer in a flotation cell or tank of a flotation separation process; and means for determining a control characteristic related to the flotation separation process based at least partly on the signalling received, consistent with that shown and described herein. The apparatus may also include one or more other means for implementing the functionality associated with the various features set forth herein.

BRIEF DESCRIPTION OF THE DRAWING

The drawing includes FIGS. 1-4, which may not be drawn to scale, as follows:

FIG. 1a is a block diagram of a mineral extraction processing system in the form of a copper concentrator that is known in the art.

FIG. 1b is a block diagram showing typical processing stages of a mineral extraction processing system that is known in the art.

FIG. 2 is a block diagram of apparatus according to some embodiments of the present invention.

FIG. 4 is a block diagram of a method having steps for implementing a flotation separation process according to some embodiments of the present invention.

DETAILED DESCRIPTION OF BEST MODE OF THE INVENTION

Figure 3:
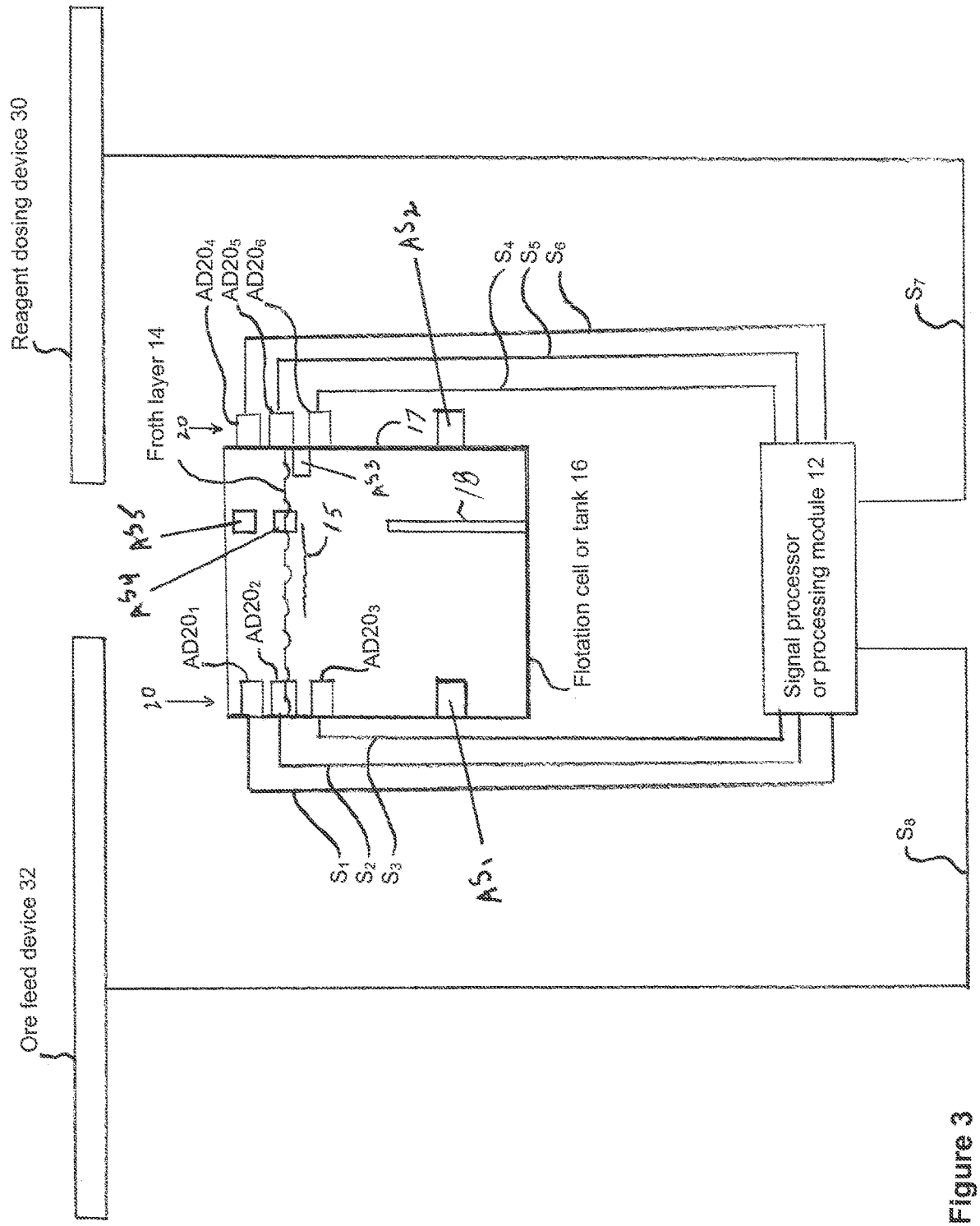
FIG. 3 is a diagram of the apparatus shown in FIG. 2 arranged in relation to a flotation cell or tank according to some embodiments of the present invention.

FIG. 2 shows the present invention in the form of apparatus 10 configured to control a flotation separation process, including parameters of the flotation process and reagent addition to optimize mineral recovery. By way of example, FIG. 3 shows at least part of the flotation separation process, which, e.g., may be configured to form part of the mineral extraction processing system shown in FIG. 1a, according to some embodiments of the present invention.

In FIG. 2, the apparatus 10 may include a signal processor or processing module 12 configured to receive signalling containing information about at least one acoustic characteristic of a froth layer 14 in a flotation cell or tank 16 of the flotation separation process shown in FIG. 3 and determine a control characteristic related to the flotation separation process based at least partly on the signalling received. The signal processor or processing module 12 may also be configured to provide corresponding signalling, e.g., along signal path 19, containing information to control the flotation separation process based at least partly on the control characteristic determined.

The apparatus 10 may also include at least one acoustic detection means or device generally indicated as 20 shown in FIG. 3 configured to sense the at least one acoustic characteristic of the froth layer 14 in the flotation cell 16 and provide the signalling $S_1$, $S_2$, $S_3$, $S_4$, $S_5$, $S_6$, e.g., along the signal path 18 (FIG. 2), containing information about the at least one acoustic characteristic of the froth layer 14 in the flotation cell or tank 16 of the flotation separation process. In FIG. 3, the at least one acoustic detection means or device 20 may include one or more of acoustic detection means or device labeled $AD20_1$, $AD20_2$, $AD20_3$, $AD20_4$, $AD20_5$, $AD20_6$. By way of example, and consistent with that shown in FIG. 3, the flotation separation process may also include a reagent dosing device 30 configured to provide a reagent dosing to the flotation cell or tank, e.g., in response to a reagent dosing signal $S_7$, as well as an ore feed device 32 configured to provide or feed ore to the flotation cell or tank, e.g., in response to an ore feed signal $S_8$. Reagent dosing device like element 30 and ore feed device like element 32 are known in the art, and the scope of the invention is not intended to be limited to any particular type or kind thereof either now known or later developed in the future.

According to some embodiments of the present invention, acoustic sensing may be used to monitor the characteristics of the froth layer 14 in the flotation cell 16 to thereby maximize the recovery of ore. The acoustic characteristics of the froth layer 14 may then be used to control, e.g., the reagent dosing, ore feed rate, ore feed density, froth depth, superficial gas velocity or other aspects of the flotation cell, e.g., to maximize ore recovery.

According to some embodiments of the present invention, the acoustic characteristics of the ore may be monitored by using the acoustic detection means 20, such as by using one or more microphones. The acoustic detection means 20 may be placed above the froth layer 14 like elements $AD20_1$, $AD20_4$, directly in or near the froth layer 14 like elements $AD20_2$, $AD20_5$, or below the froth layer 14 like elements AD20$_3$, AD20$_6$, consistent with that shown in FIG. 3. Acoustic detection means 20, such as elements AD20$_1$, AD20$_2$, AD20$_3$, AD20$_4$, AD20$_5$, AD20$_6$, including microphones, for placing, arranging, or configuring above, below or in the froth layer 14 are known in the art, and the scope of the invention is not intended to be limited to any particular type or kind thereof either now known or later developed in the future.

According to some embodiments of the present invention, where the acoustic detection means 20 is placed below the froth layer 14, such as elements AD20$_3$, AD20$_6$, the acoustic detection means may be configured to monitor the acoustics of the froth cell or tank 16 reflected at the interface between the froth layer 14 and the layer below, known as the pulp zone and generally indicated by reference label 15, due to the difference in acoustic impedance between the froth layer 14 and the pulp zone 15.

According to some embodiments of the present invention, the acoustic detection means 20 may be positioned at a number of locations, such as above, within, and/or below the froth layer to monitor the acoustic characteristics of the froth layer. In FIG. 3, the two or more acoustic detection means 20 are placed above and below the froth layer 14, such as elements AD20$_1$, AD20$_4$ and AD20$_3$, AD20$_6$, in, near and below the froth layer 14, such as elements AD20$_2$, AD20$_5$ and AD20$_3$, AD20$_6$, or entirely within the froth layer 14, such as element AD20$_2$, so the acoustic detection means 20 may be configured to monitor the attenuation through the froth layer 14, between the froth layer 14 and the pulp zone 15, between the froth layer 14 and the air above the froth layer 14, or any combination.

According to some embodiments of the present invention, acoustic detection sensors, such as AD20$_2$, AD20$_4$ and AD20$_6$, may be mounted external to the flotation cell 16, e.g., including on an outside wall 17. In such embodiments, an acoustic guide or waveguide 18 may be placed within the flotation cell or tank 16 to optimize the acquisition of the acoustic signal. For example, the acoustic waveguide 18 may be placed within the flotation cell or tank 16 such that the acoustic waveguide 18 interacts with the solution in the flotation cell or tank 16 and gas bubbles, and the separate acoustic detection means AD20$_2$, AD20$_4$ and AD20$_6$ are mounted on the exterior, e.g., on the outside wall 17, of the flotation cell or tank 16 to acquire the acoustic signal from the acoustic waveguide 18.

According to some embodiments of the present invention, the acoustic detection means 20 may also be used to monitor the acoustic characteristics of bubbles in the pulp zone 15 to control the flotation cell or tank 16 to optimize ore recovery.

According to some embodiments of the present invention, the acoustic detection techniques described herein may also be augmented with acoustic sources AS$_1$, AS$_2$, AS$_3$, AS$_4$, AS$_5$ placed in the froth layer 14 like elements AS$_4$, under the froth layer 14 like elements AS$_1$, AS$_2$, next to the froth layer 14 like elements AS$_3$ or above the froth layer 14 like element AS$_5$. Acoustic sources are known in the art, and the scope of the invention is not intended to be limited to any particular type or kind thereof either now known or later developed in the future. Moreover, a person skilled in the art would be able to place, implement, arrange or configure the acoustic source in, under, next to or above the froth layer 14 consistent with that shown in FIG. 3 and described herein without undue experimentation, and the scope of the invention is not intended to be limited to any particular type or kind of placement, implementation, arrangement or configuration of the acoustic source in, under, next to or above the froth layer 14 in order to implement the present invention consistent with that disclosed herein.

The Flotation Process

The present invention is described in relation to a flotation separation process, e.g., which may be configured to form part of the flotation process shown in FIG. 1b, which itself may be configured to form part of the mineral extraction processing system shown in FIG. 1a. However, the scope of the invention is not intended to include, or form part of, any particular type or kind of flotation process, or any particular type or kind of mineral extraction process system. For example, embodiments are envisioned in which the present invention may be implemented in other types or kinds of processes either now known or later developed in the future, including other types or kinds of flotation processes either now known or later developed in the future, as well as other types or kinds of mineral extraction process systems either now known or later developed in the future.

FIG. 4

The Method

According to some embodiments, the present invention may take the form of a method to control of a flotation separation process, including parameters of the flotation process and reagent addition to optimize mineral recovery. By way of example, FIG. 4 shows a flowchart generally indicated as 48 having steps 50, 52 and 54 for implementing the flotation separation process, including a step 50 for receiving signalling containing information about at least one acoustic characteristic of such a froth layer 14 in such a flotation cell or tank 16 of such a flotation separation process as shown in FIG. 3, and a step 52 for determining a control characteristic related to the flotation separation process based at least partly on the signalling received, e.g., using such an apparatus 10, including such a signal processor or processing module 12. The method may also include a step 54 for providing corresponding signalling containing information to control the flotation separation process based at least partly on the control characteristic determined, and as well as one or more other steps for implementing the other functionality set forth herein according to some embodiments of the present invention.

The Signal Processor or Processing Module 12

According to some embodiments of the present invention, the functionality of the signal processor or processing module 12 may be implemented using hardware, software, firmware, or a combination thereof.

By way of example, and consistent with that shown and described herein, the signal processor or signal processing module 12 may be configured with at least one processor and at least one memory including computer program code, where the at least one memory and the computer program code are configured, with the at least one processor, to cause the apparatus at least to receive the signalling and determine the control characteristic in order to implement the present invention consistent with that disclosed herein.

In a typical software implementation, the signal processor or signal processing module 12 may include one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular type or kind of signal processing implementation using technology either now known or later developed in the future.

Applications Re Other Industrial Processes

By way of example, the present invention is described in relation to, and part of, a mineral extraction processing system for extracting minerals from ore. However, the scope of the invention is intended to include other types or kinds of industrial processes either now known or later developed in the future, including any mineral process, such as those related to processing substances or compounds that result from inorganic processes of nature and/or that are mined from the ground, as well as including either other extraction processing systems or other industrial processes, where the sorting, or classification, of product by size is critical to overall industrial process performance.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. An apparatus comprising:
   a flotation cell or flotation tank for separating minerals and said cell or tank having an ore solution, gas bubbles and a froth layer;
   an acoustic waveguide placed in said cell or tank and said waveguide interacts with said ore solution and gas bubbles and optimally receives an acoustic attenuation related to the froth layer in said cell or tank, a separate acoustic detection device mounted exterior to the cell or tank which receives the acoustic signal from the acoustic waveguide,
   a signal processor or processing module configured at least to:
      receive signaling containing information about said acoustic attenuation related to said froth layer in said cell or tank from said acoustic detection device; and
      determine corresponding signaling containing information about a control characteristic related to the operation of said cell or tank, based at least partly on the signaling received from said acoustic detection device.

2. Apparatus according to claim 1, wherein the signal processor or processing module is configured to provide the corresponding signaling as control signaling to control the operation of the cell or tank based at least partly on the control characteristic determined.

3. Apparatus according to claim 1, wherein the control characteristic relates to parameters of the operation of the cell or tank and reagent addition to optimize minerals recovery.

4. Apparatus according to claim 2, wherein the signal processor or processing module is configured to control reagent dosing, ore feed rate, ore feed density, froth depth, superficial gas velocity or other aspects of the flotation cell or tank to maximize ore recovery, based upon the control characteristic determined.

5. Apparatus according to claim 1, said apparatus further comprises a second acoustic detecting device including a microphone wherein the signal processor or processing module is configured to receive the signaling from said microphone.

6. Apparatus according to claim 5, wherein the signal processor or processing module is configured to monitor the at least one acoustic characteristic of ore based at least partly on the signaling received from the microphone.

7. Apparatus according to claim 5, wherein the microphone is placed either above the froth layer, or directly in the froth layer, or below the froth layer.

8. Apparatus according to claim 1, wherein the signal processor or processing module is configured to receive the signaling a second from acoustic detection device, including a microphone, placed below the froth layer and monitor acoustics of said cell or tank reflected at an interface between the froth layer and a layer below the froth layer, including or also known as a pulp zone, based at least partly on a difference in an acoustic impedance between the froth layer and the pulp zone.

9. Apparatus according to claim 1, wherein the signal processor or processing module is configured to receive signals from two or more acoustic detection devices placed above and below the froth layer, in and below the froth layer, or entirely within the froth layer, and monitor the acoustic attenuation through the froth layer, between the froth layer and the pulp zone, between the froth layer and the air above the froth layer, or any combination, based at least partly on the signals received.

10. Apparatus according to claim 1, wherein the signal processor or processing module is configured to receive the signaling from acoustic detection devices positioned at a number of locations, including above, within, and/or below the froth layer and monitor the acoustic characteristics of the froth layer.

11. Apparatus according to claim 1, wherein the signal processor or processing module is configured to receive the signaling from said acoustic detection device and monitor acoustic characteristics of bubbles in a pulp zone below the froth layer to control the flotation cell or tank to optimize ore recovery.

12. Apparatus according to claim 1, wherein the signal processor or signal processing module is configured to receive the signaling from an acoustic detection device augmented with acoustic sources configured, arranged or placed in, under, next to or above the froth layer.

* * * * *